United States Patent
Lee et al.

(10) Patent No.: US 10,262,434 B2
(45) Date of Patent: Apr. 16, 2019

(54) VEHICLE LOCALIZATION APPARATUS AND METHOD

(71) Applicants: Hyundai Motor Company, Seoul (KR); Kia Motors Corporation, Seoul (KR)

(72) Inventors: Kang Hoon Lee, Hwaseong-si (KR); Jae Hong Lee, Incheon (KR); Dong Ha Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 35 days.

(21) Appl. No.: 15/616,748

(22) Filed: Jun. 7, 2017

(65) Prior Publication Data

US 2018/0174321 A1 Jun. 21, 2018

(30) Foreign Application Priority Data

Dec. 15, 2016 (KR) ........................ 10-2016-0171742

(51) Int. Cl.

| G06T 7/00 | (2017.01) |
|---|---|
| G06T 7/73 | (2017.01) |
| G06K 9/46 | (2006.01) |
| G06T 7/11 | (2017.01) |
| G06T 11/60 | (2006.01) |
| G06T 7/50 | (2017.01) |
| G01C 21/32 | (2006.01) |
| H04N 13/204 | (2018.01) |
| G06K 9/00 | (2006.01) |
| H04N 13/239 | (2018.01) |

(Continued)

(52) U.S. Cl.
CPC ............... *G06T 7/73* (2017.01); *G01C 21/32* (2013.01); *G06K 9/00791* (2013.01); *G06K 9/00838* (2013.01); *G06K 9/4604* (2013.01); *G06T 7/11* (2017.01); *G06T 7/50* (2017.01); *G06T 11/60* (2013.01); *H04N 13/204* (2018.05); *H04N 13/239* (2018.05); *G01C 21/165* (2013.01); *G06T 2215/12* (2013.01); *H04N 2013/0081* (2013.01)

(58) Field of Classification Search
CPC ..... G06T 7/73; G06T 7/50; G06T 7/11; G06T 11/60; G06T 2215/12; H04N 13/204; G01C 21/32; G01C 21/165; G06K 9/00791; G06K 9/00838; G06K 9/4604
See application file for complete search history.

(56) References Cited

U.S. PATENT DOCUMENTS

| 2008/0167814 A1* | 7/2008 | Samarasekera ...... G01C 21/005 |
| | | 701/469 |
| 2010/0004856 A1* | 1/2010 | Kobori ..................... G01S 19/48 |
| | | 701/532 |

(Continued)

*Primary Examiner* — Ping Y Hsieh
(74) *Attorney, Agent, or Firm* — Slater Matsil, LLP

(57) ABSTRACT

A vehicle localization method includes obtaining a stereo image while a vehicle is driven, extracting a matching vector from the stereo image while the vehicle is driven, loading a map vector of a current location based on GPS information in previously constructed map data, matching the extracted matching vector with the map vector, and estimating a positioning coordinate corresponding to the extracted matching vector as a current location of the vehicle when the extracted matching vector and the map vector meet a condition.

10 Claims, 20 Drawing Sheets

(51) Int. Cl.
*G01C 21/16* (2006.01)
*H04N 13/00* (2018.01)

(56) References Cited

U.S. PATENT DOCUMENTS

| | | | |
|---|---|---|---|
| 2011/0206236 A1* | 8/2011 | Center, Jr. | G06T 7/579 |
| | | | 382/103 |
| 2011/0282622 A1* | 11/2011 | Canter | G06K 9/00691 |
| | | | 702/150 |
| 2015/0130848 A1* | 5/2015 | Sakaniwa | G06T 17/05 |
| | | | 345/666 |
| 2016/0063341 A1* | 3/2016 | Ogata | G06K 9/00798 |
| | | | 382/103 |

* cited by examiner

CURRENT IMAGE DURING DRIVING

IMAGE MATCHED WITH VECTOR OF CURRENT LOCATION

VEHICLE LOCALIZATION APPARATUS AND METHOD

CROSS-REFERENCE TO RELATED APPLICATIONS

This application is based on and claims the benefit of priority to Korean Patent Application No. 10-2016-0171742, filed on Dec. 15, 2016, in the Korean Intellectual Property Office, the disclosure of which is incorporated herein in its entirety by reference.

TECHNICAL FIELD

The present disclosure relates to a vehicle localization apparatus and method.

BACKGROUND

In general, in a satellite navigation device used for localization, since interference in satellites occurs due to obstacles such as buildings in urban areas, an error of dozens of meters or more can occur or shadow areas may exist where it is impossible to receive signals.

Therefore, in related art, technologies of receiving correction data of base stations located on the ground and correcting location information have been developed. Examples of these technologies include differential global positioning system (DGPS) and real-time kinematic (RTK). However, in case of such location information correction technologies, there are shadow areas due to obstacles.

Thus, there is a method for loading sensors for dead reckoning into each vehicle. However, since such sensors are high-priced equipment, it is difficult to load the sensors into all of vehicles.

SUMMARY

Embodiments of the present disclosure relate to a precise vehicle localization apparatus, a method therefor, a map construction apparatus therefor, and a map construction method therefor. For example, particular embodiments relate to technologies for correcting a location of a vehicle and performing precise vehicle localization in urban areas based on stereo cameras.

Embodiments of the invention can solve problems mentioned above occurring in the prior art while maintaining advantages achieved by the prior art.

An aspect of the present disclosure provides a precise vehicle localization apparatus, a method therefor, a map construction apparatus therefor, and a map construction method therefor, for accurately estimating a location of a vehicle using a matching vector extracted from a stereo camera image during real driving and constructed map data.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a precise vehicle localization apparatus may include an image input unit configured to obtain a stereo image while a vehicle is driven. A matching vector extracting unit is configured to extract a matching vector from the stereo image while the vehicle is driven. A real-time localization unit is configured to load a map vector of a current location based on global positioning system (GPS) information in previously constructed map data and estimate a current location of the vehicle using the extracted matching vector and the loaded map vector.

The matching vector extracting unit may include a region of interest (ROI) setting unit configured to divide the stereo image into a gray image and a depth image and set an ROI, an edge image converting unit configured to convert the gray image into an edge image, a line component detecting unit configured to extract a line component from the edge image, an image fusing unit configured to fuse a gray image, from which the line component is extracted, with the depth image, a dominant depth extracting unit configured to extract at least one or more dominant depth values from the fused image, and a matching vector extractor configured to extract the matching vector for the at least one or more dominant depth values from the stereo image.

The matching vector extracting unit may be configured to: extract a horizontal cumulative vector which is a matching vector for each of the at least one or more dominant depth values from the stereo image and extract a vertical cumulative vector which is a matching vector for each of the at least one or more dominant depth values from the stereo image.

The real-time localization unit may include a map vector loading unit configured to load the map vector of the current location based on GPS information in the map data, a vector matching unit configured to match the extracted matching vector with the map vector, and a vehicle localization unit configured to estimate a positioning coordinate corresponding to the extracted matching vector as a current location of the vehicle, if the extracted matching vector and the map vector meet a condition.

The vector matching unit may be configured to extract a depth value, corresponding to a dominant depth value extracted from the stereo image while the vehicle is driven, from the map data, extract a map vector, corresponding to a horizontal cumulative vector obtained from the stereo image while the vehicle is driven, from the map data, and extract a map vector, corresponding to a vertical cumulative vector obtained from the stereo image while the vehicle is driven, from the map data, if a map vector corresponding to the horizontal cumulative vector meets a reference value.

According to another aspect of the present disclosure, a map construction apparatus may include: an image input unit configured to obtain a stereo image during driving, a matching vector extracting unit configured to extract a matching vector from the stereo image during the driving, and a map constructing unit configured to construct map data based on the matching vector extracted by the matching vector extracting unit and location information by a position sensor.

The position sensor may include an inertial measurement unit (IMU) or a real-time kinematic (RTK).

The map constructing unit may include: a vector and positioning coordinate accumulating unit configured to construct the map data by accumulating and storing the matching vector extracted by the matching vector extracting unit and the location information by the position sensor and a map vector filtering unit configured to construct last map data by performing pseudovector filtering using an autocorrelation coefficient for the map data.

According to another aspect of the present disclosure, a map construction method may include: obtaining a stereo image during driving, adding location information using a position sensor for each frame of the stereo image during the driving, extracting a matching vector at regular intervals from the stereo image during the driving, and constructing map data by accumulating and storing the extracted matching vector and the location information.

The method may further include: constructing last map data by performing pseudovector filtering using an autocorrelation for the map data.

The extracting of the matching vector may include: receiving the stereo image, dividing the stereo image into a gray image and a depth image, fusing the gray image with the depth image, extracting at least one or more dominant depth values from the fused image, and extracting the matching vector for the at least one or more depth values from the stereo image.

The fusing of the gray image with the depth image may include: converting the gray image into an edge image, extracting a line component from the edge image, and fusing a gray image, from which the line component is extracted, with the depth image.

The extracting of the matching vector for the at least one or more dominant depth values may include: extracting a horizontal cumulative vector which is a matching vector for each of the at least one or more dominant depth values and extracting a vertical cumulative vector which is a matching vector for each of the at least one or more dominant depth values.

The location information may be location information sensed by an IMU or an RTK.

According to another aspect of the present disclosure, a precise vehicle localization method may include obtaining a stereo image while a vehicle is driven, extracting a matching vector from the stereo image while the vehicle is driven, loading a map vector of a current location based on GPS information in previously constructed map data, matching the extracted matching vector with the map vector, and estimating a positioning coordinate corresponding to the extracted matching vector as a current location of the vehicle, if the extracted matching vector and the map vector meet a condition.

The extracting of the matching vector may include: receiving the stereo image, dividing the stereo image into a gray image and a depth image, fusing the gray image with the depth image, extracting at least one or more dominant depth values from the fused image, and extracting the matching vector for the at least one or more depth values from the stereo image.

The fusing of the gray image with the depth image may include: converting the gray image into an edge image, extracting a line component from the edge image, and fusing a gray image, from which the line component is extracted, with the depth image.

The extracting of the matching vector for the at least one or more dominant depth values may include extracting a horizontal cumulative vector which is a matching vector for each of the at least one or more dominant depth values from the stereo image and extracting a vertical cumulative vector which is a matching vector for each of the at least one or more dominant depth values from the stereo image.

The matching of the extracting matching vector with the map data may include: extracting a depth value, corresponding to a dominant depth value extracted from the stereo image while the vehicle is driven, from the map data, extracting a map vector, corresponding to the horizontal cumulative vector obtained from the stereo image while the vehicle is driven, from the map data, and extracting a map vector, corresponding to the vertical cumulative vector obtained from the stereo image while the vehicle is driven, from the map data, if a map vector corresponding to the horizontal cumulative vector meets a reference value.

The estimating as the current location of the vehicle may include: estimating a positioning coordinate corresponding to the dominant depth value as the current location of the vehicle, if a map vector corresponding to the vertical cumulative vector meets a reference value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, a description will be given in detail of embodiments of the present disclosure with reference to FIGS. 1 to 20.

Figure 1:
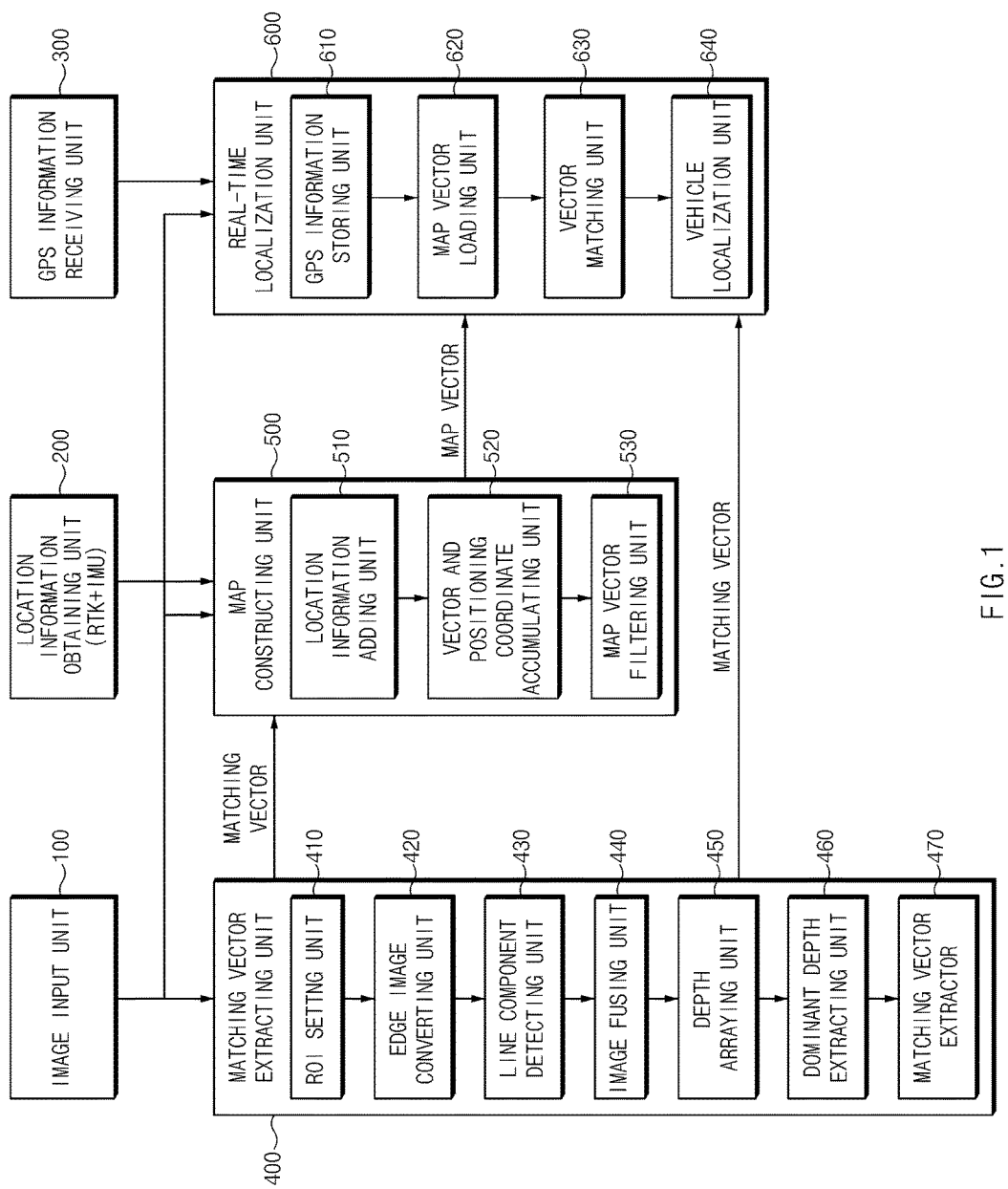
FIG. 1 is a block diagram illustrating a configuration of a precise vehicle localization apparatus according to an embodiment of the present disclosure.

FIG. 1 is a block diagram illustrating a configuration of a precise vehicle localization apparatus according to an embodiment.

The precise vehicle localization apparatus may include an image input unit 100, a location information obtaining unit 200, a global positioning system (GPS) information receiving unit 300, a matching vector extracting unit 400, a map constructing unit 500, and a real localization unit 600.

The image input unit 100 may receive a stereo image while a vehicle is driven. In this case, the image input unit 100 may include a stereo camera.

The location information obtaining unit 200 may obtain location information by sensing a location of the vehicle. For this purpose, the location information obtaining unit 200 may include a real-time kinematic (RTK) and an inertial measurement unit (IMU). In this case, the RTK and the IMU may be loaded into the vehicle for map construction shown in FIG. 10.

The GPS information receiving unit 300 may receive GPS information from a satellite. In this case, the GPS information receiving unit 300 may be loaded into the vehicle for real-time vehicle localization shown in FIG. 13. In other words, only a GPS receiving device is loaded into a general vehicle for vehicle localization according to an embodiment of the present disclosure, rather than a high-priced RTK and IMU.

The matching vector extracting unit 400 may extract a matching vector from the stereo image while the vehicle is driven. In this case, the matching vector may include vertical vectors v1 and v2 accumulated for in a vertical direction for at least one dominant depth values d1 and d2 with the largest depth distribution in a line component of an image in which a depth value is fused and horizontal vectors h1 and h2 accumulated in a horizontal direction for the at least one dominant depth values d1 and d2.

For this purpose, the matching vector extracting unit 400 may include a region of interest (ROI) setting unit 410, an edge image converting unit 420, a line component detecting unit 430, an image fusing unit 440, a depth arraying unit 450, a dominant depth extracting unit 460, and a matching vector extractor 470.

Figure 2A:
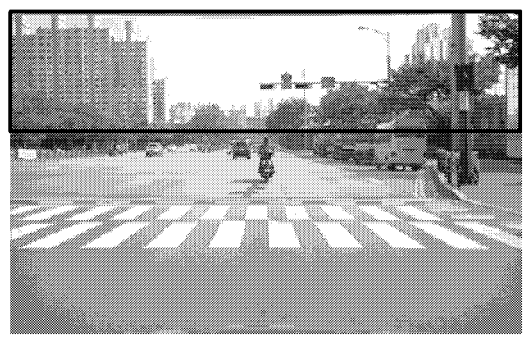
FIG. 2A is a drawing illustrating an example of a gray image in a stereo image according to an embodiment of the present disclosure.
Figure 2B:
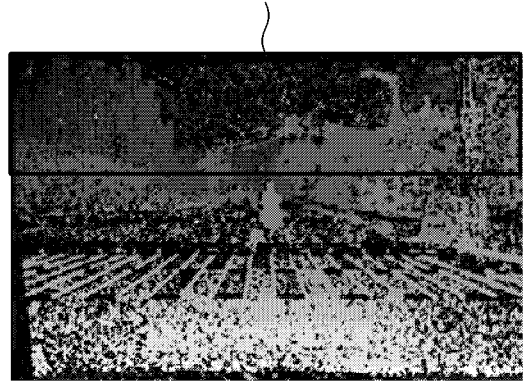
FIG. 2B is a drawing illustrating an example of a depth image in a stereo image according to an embodiment of the present disclosure.

The ROI setting unit 410 may divide the stereo image into a gray image and a depth image and may set an ROI. In this case, as shown in FIG. 2A or 2B, the ROI region may be an upper region 10 or 20 of the stereo image. FIG. 2A is a drawing illustrating an example of a gray image in a stereo image according to an embodiment of the present disclosure. FIG. 2B is a drawing illustrating an example of a depth image in a stereo image according to an embodiment of the present disclosure.

Figure 3:
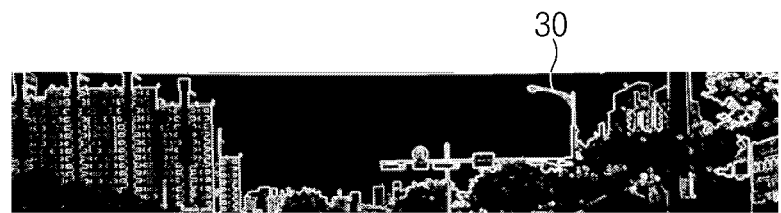
FIG. 3 is a drawing illustrating an example of converting a gray image into an edge image according to an embodiment of the present disclosure.

The edge image converting unit 420 may convert the gray image into an edge image. FIG. 3 is a drawing illustrating an example of converting a gray image into an edge image according to an embodiment of the present disclosure. As shown in FIG. 3, it may be known that the gray image is converted into an edge image on which an edge 30 is displayed.

Figure 4:
FIG. 4 is a drawing illustrating an example of detecting a line component from an edge image of FIG. 3.

The line component detecting unit 430 may extract a line component from the edge image. FIG. 4 is a drawing illustrating an example of detecting a line component from an edge image of FIG. 3. As shown in FIG. 4, it may be known that only the line component is displayed.

Figure 5:
FIG. 5 is a drawing illustrating an example of fusing a gray image, from which a line component of FIG. 4 is extracted, with a depth image of FIG. 2B.

The image fusing unit 440 may fuse a gray image (see FIG. 4), from which the line component is extracted, with the depth image (see FIG. 2B). FIG. 5 is a drawing illustrating an example of fusing a gray image, from which a line component of FIG. 4 is extracted, with a depth image of FIG. 2B. Referring to FIG. 5, it may be known that only the line component is displayed.

The depth arraying unit 450 may extract and array depth values corresponding to a line pixel coordinate detected after the gray image is fused with the depth image.

The dominant depth extracting unit 460 may extract at least one or more dominant depth values from the fused image. In this case, an embodiment of the present disclosure is exemplified as two dominant depth values d1 and d2 are extracted. In this case, the dominant depth value may refer to a depth value with the largest depth distribution in a line component in which a depth value is fused by image fusion.

Figure 6A:
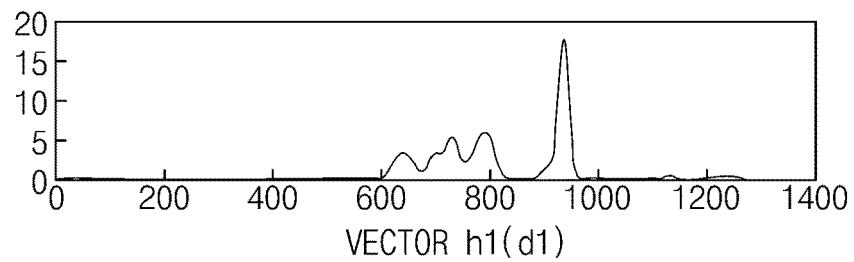
FIG. 6A is a drawing illustrating an example of a matching vector h1 horizontally accumulated for one d1 of two dominant depth values in a fusion image of FIG. 5.
Figure 6B:
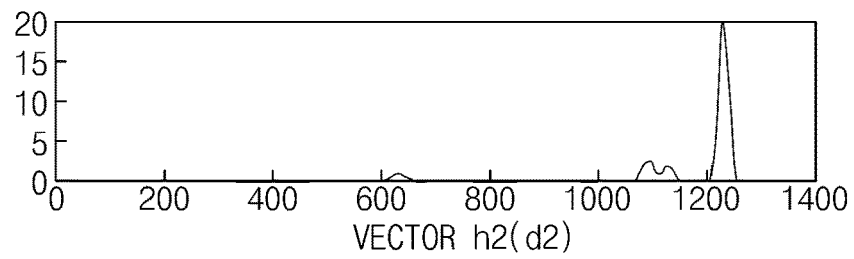
FIG. 6B is a drawing illustrating an example of a matching vector h2 horizontally accumulated for one d2 of two dominant depth values in a fusion image of FIG. 5.
Figure 6C:
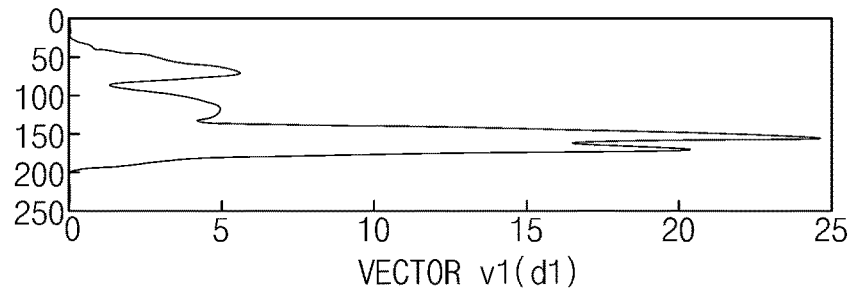
FIG. 6C is a drawing illustrating an example of a matching vector v1 vertically accumulated for one d1 of two dominant depth values in a fusion image of FIG. 5.
Figure 6D:
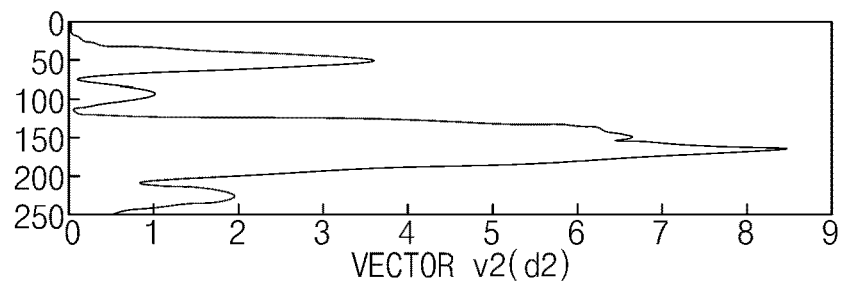
FIG. 6D is a drawing illustrating an example of a matching vector v2 vertically accumulated for one d2 of two dominant depth values in a fusion image of FIG. 5.

The matching vector extractor 470 may extract a matching vector for the at least one or more dominant depth values. In other words, the matching vector extractor 470 may accumulate a pixel corresponding to each of the at least one or more dominant depth values d1 and d2 in an ROI horizontal direction and may extract horizontal cumulative vectors h1 and h2. The matching vector extractor 470 may accumulate a pixel corresponding to each of the at least one or more dominant depth values d1 and d2 in an ROI vertical direction and may extract vertical cumulative vectors v1 and v2. FIG. 6A is a drawing illustrating an example of a matching vector h1 horizontally accumulated for one d1 of two dominant depth values in a fusion image of FIG. 5. FIG. 6B is a drawing illustrating an example of a matching vector h2 horizontally accumulated for one d2 of two dominant depth values in a fusion image of FIG. 5. FIG. 6C is a drawing illustrating an example of a matching vector v1 vertically accumulated for one d1 of two dominant depth values in a fusion image of FIG. 5. FIG. 6D is a drawing illustrating an example of a matching vector v2 vertically accumulated for one d2 of two dominant depth values in a fusion image of FIG. 5.

The map constructing unit 500 may construct map data based on the matching vector extracted by the matching vector extracting unit 400 and location information by a position sensor (e.g., the RTK or the IMU).

For this purpose, the map constructing unit 500 may include a location information adding unit 510, a vector and positioning coordinate accumulating unit 520, and a map vector filtering unit 530.

The location information adding unit 510 may add location information (latitude, longitude) using the IMU or the RTK for each frame of the stereo image while the vehicle is driven. In this case, the map constructing unit 500 may interwork with the matching vector extracting unit 400 to extract matching vectors d1, d2, h1, h2, v1, and v2 at regular intervals from the stereo image while the vehicle is driven.

The vector and positioning coordinate accumulating unit 520 may construct map data by accumulating and storing the matching vector extracted by the matching vector extracting unit 400 and the location information by the position sensor.

The map vector filtering unit 530 may construct the last map data by performing pseudovector filtering using an autocorrelation coefficient for the map data.

Figure 7:
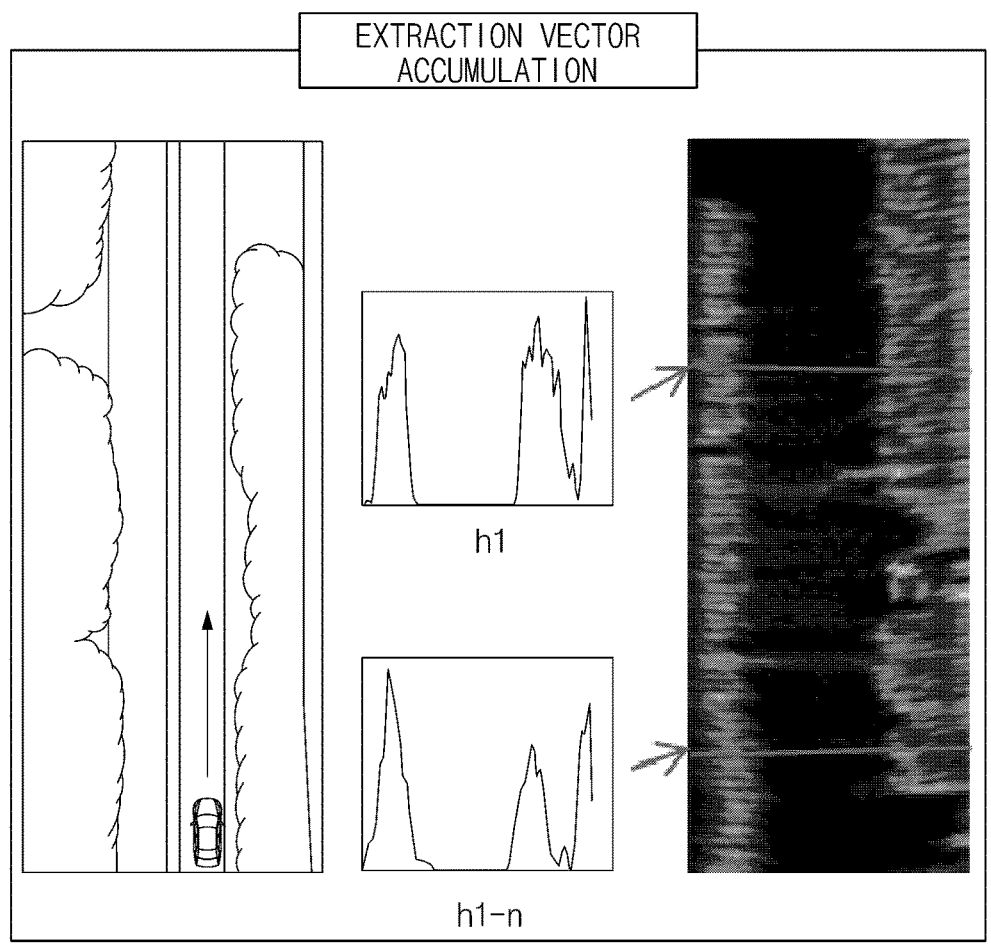
FIG. 7 is a drawing illustrating an example of a matching vector h1 in a four-lane image according to an embodiment of the present disclosure.
Figure 8:
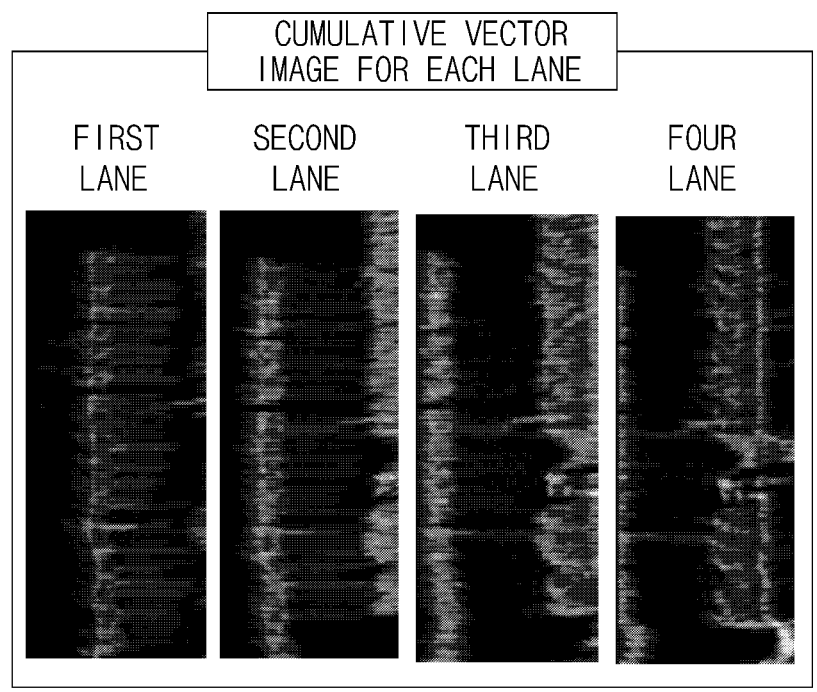
FIG. 8 is a drawing illustrating an example of an image of a cumulative vector for each lane of FIG. 7.
Figure 9:
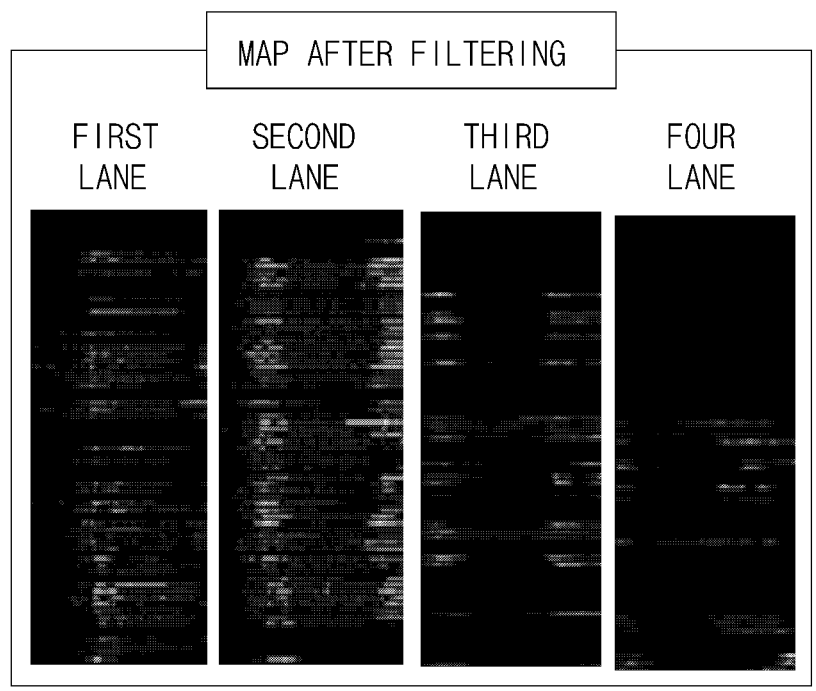
FIG. 9 is a drawing illustrating an example of a map after filtering a cumulative vector for each lane of FIG. 8.
Figure 10:
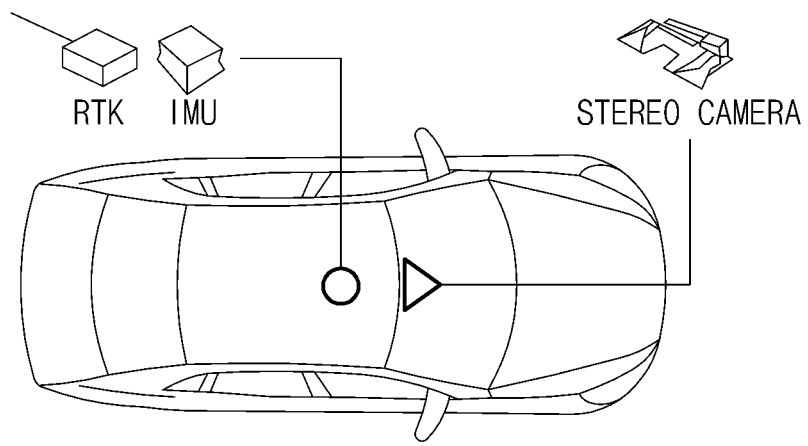
FIG. 10 is a drawing illustrating an example of installing a position sensor (e.g., a real-time kinematic (RTK) or an inertial measurement unit (IMU)) and a stereo camera in a vehicle for map construction according to an embodiment of the present disclosure.

FIG. 7 is a drawing illustrating an example of a matching vector h1 in a four-lane image according to an embodiment of the present disclosure. FIG. 8 is a drawing illustrating an example of an image of a cumulative vector for each lane of FIG. 7. FIG. 9 is a drawing illustrating an example of a map after filtering a cumulative vector for each lane of FIG. 8. FIGS. 7 to 9 illustrate an example of constructing a map with a matching vector h1 in a four-lane image. A map may be constructed with matching vectors h2, v1, and v2 in the same method as that in FIGS. 7 to 9.

The real-time localization unit 600 may load a map vector of a current location based on GPS information in the map data and may estimate a current location of the vehicle using the extracted matching vector and the loaded map data.

For this purpose, the real-time localization unit 600 may include a GPS information storing unit 60, a map data loading unit 620, a vector matching unit 630, and a vehicle localization unit 640.

The GPS information storing unit 610 may store GPS information.

The map vector loading unit 620 may load map data of a current location based on the GPS information in the map data.

The vector matching unit 630 may match the matching vector extracted by the matching vector extracting unit 400 with the map vector. In this case, the real-time localization unit 600 may interwork with the matching vector extracting unit 400 to receive the extracted matching vector in real time.

Figure 11:
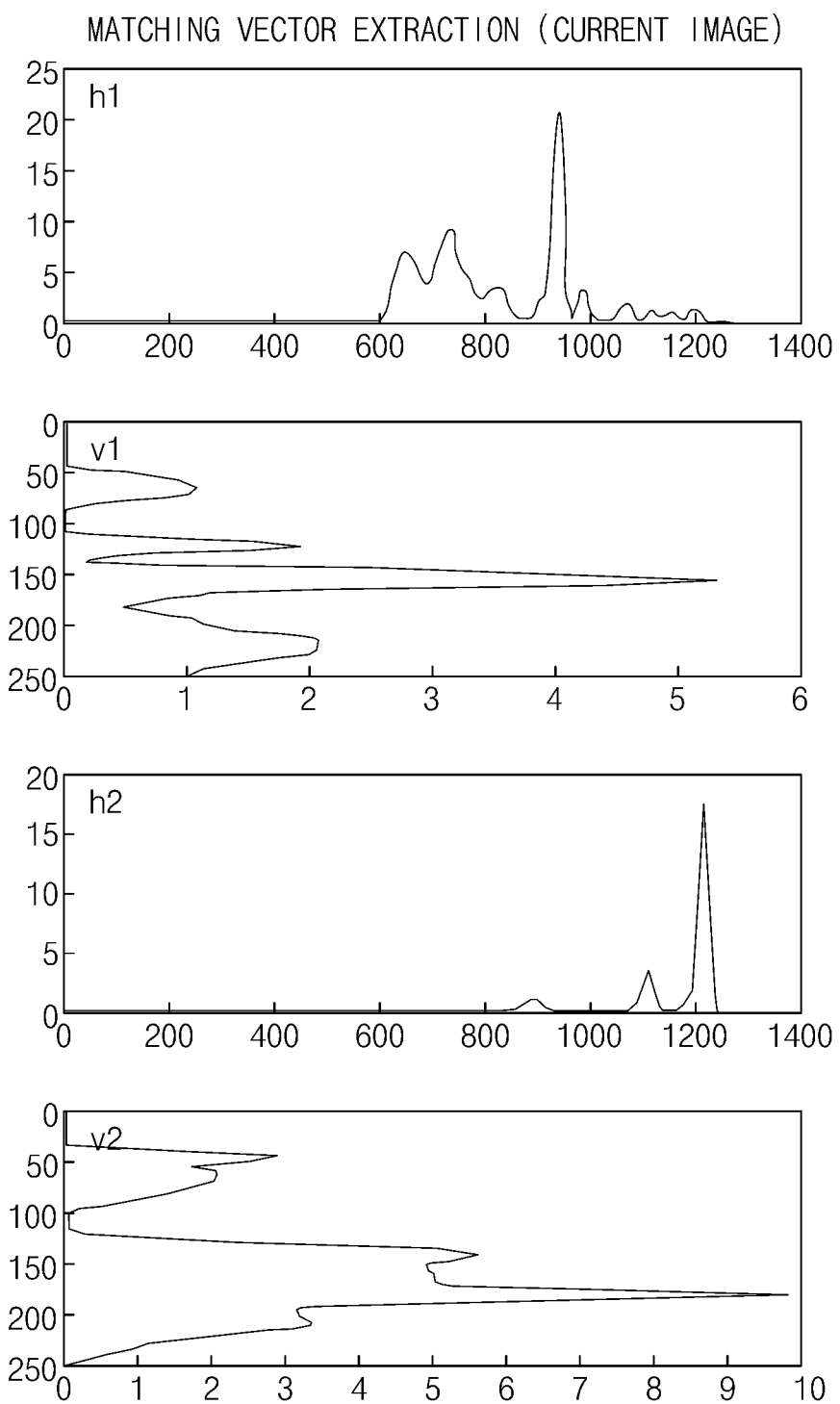
FIG. 11 is a drawing illustrating an example of a matching vector extracted from a real stereo image for real-time localization according to an embodiment of the present disclosure.
Figure 12:
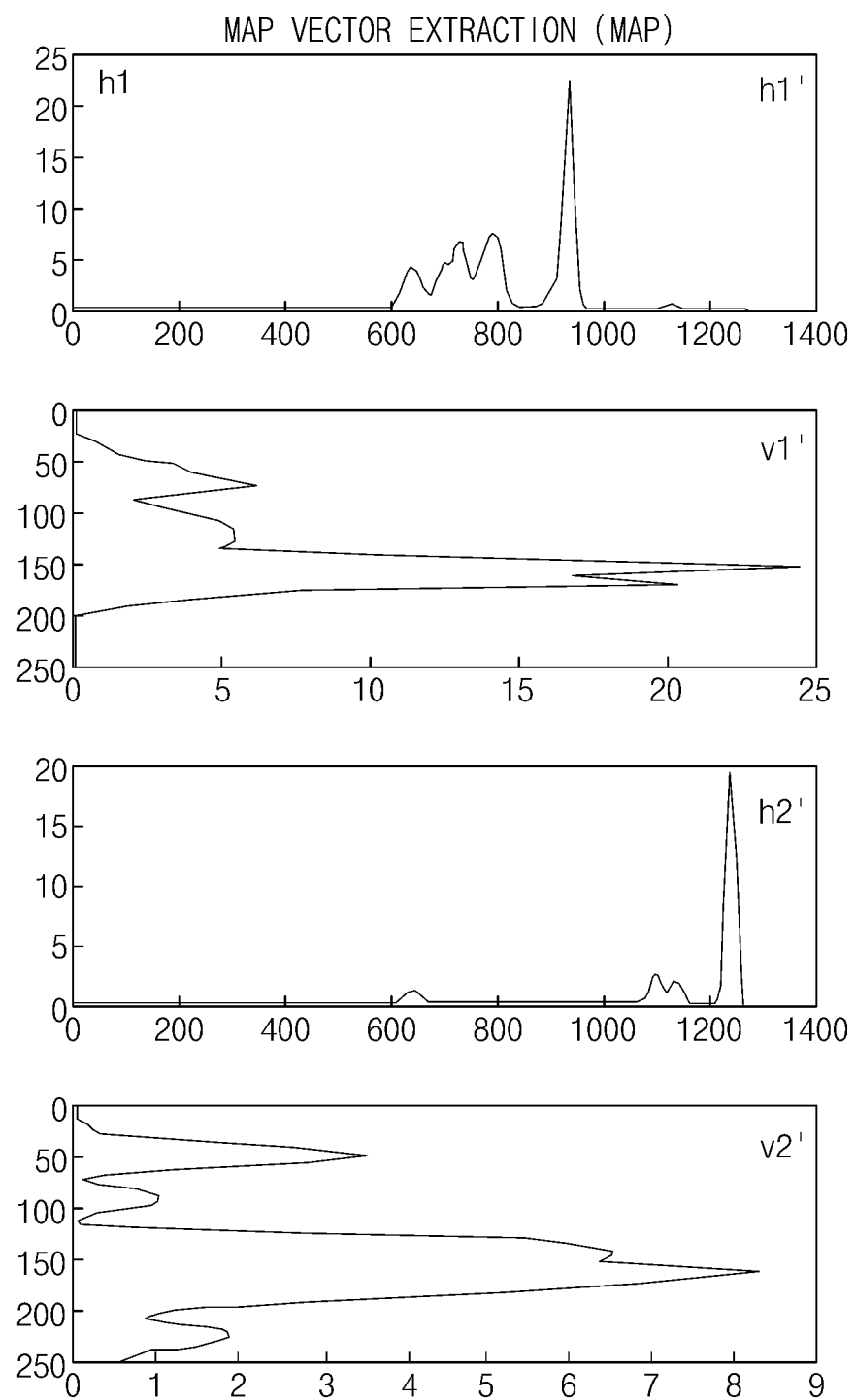
FIG. 12 is a drawing illustrating an example of a map vector extracted from map data according to an embodiment of the present disclosure.
Figure 13:
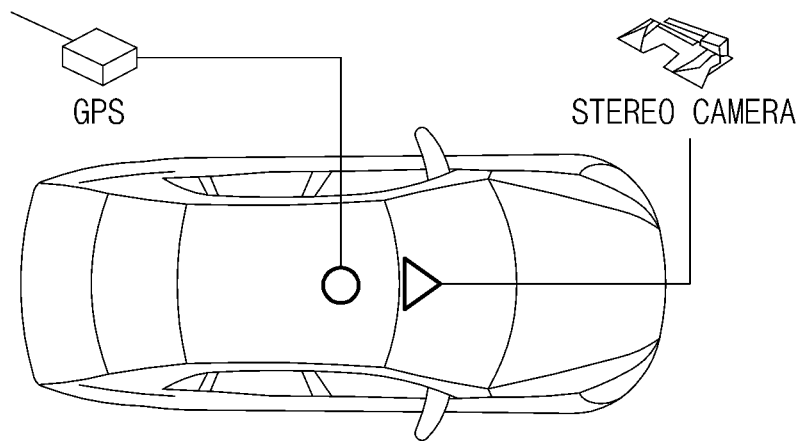
FIG. 13 is a drawing illustrating an example of installing a global positioning system (GPS) receiving unit and a stereo camera in a vehicle for real-time localization according to an embodiment of the present disclosure.

The vector matching unit 630 may extract depth values d1' and d2', corresponding to dominant depth values d1 and d2 extracted from the stereo image while the vehicle is driven, from the map data. Also, the vector matching unit 630 may extract map vector h1' and h2', corresponding to horizontal cumulative vectors h1 and h2 obtained from the stereo image while the vehicle is driven, from the map data. Also, if the map vectors h1' and h2' respectively corresponding to the horizontal cumulative vectors h1 and h2 meet a reference value, the vector matching unit 630 may extract map vector v1' and v2', corresponding to vertical cumulative vectors v1 and v2 obtained from the stereo image while the vehicle is driven, from the map data. FIG. 11 is a drawing illustrating an example of matching vectors h1, h2, v1, and v2 extracted from a real stereo image for real-time localization according to an embodiment of the present disclosure. FIG. 12 is a drawing illustrating an example of map vectors h1', h2', v1', and v2' extracted from map data according to an embodiment of the present disclosure.

If the extracted matching vectors h1, h2, v1, and v2 and the extracted map vectors h1', h2', v1', and v2' meet a condition, the vehicle localization unit 640 may estimate a positioning coordinate corresponding to the extracted matching vectors h1, h2, v1, and v2 as a current location of the vehicle.

As such, a position sensor such as an RTK or an IMU may be attached to a vehicle for map data construction according to an embodiment of the present disclosure to extract a matching vector and construct map data. Then later, general vehicles may previously store the constructed map data or may be receive and use the constructed in real time. In other words, the matching vector extracting unit 400 and the real-time localization unit 600 according to an embodiment of the present disclosure may be loaded into a general vehicle. The matching vector extracting unit 400, the map constructing unit 500, and the position sensor may be loaded into a vehicle for map construction.

Hereinafter, a description will be given of a method S100 for extracting a matching vector according to an embodiment of the present disclosure.

Figure 14:
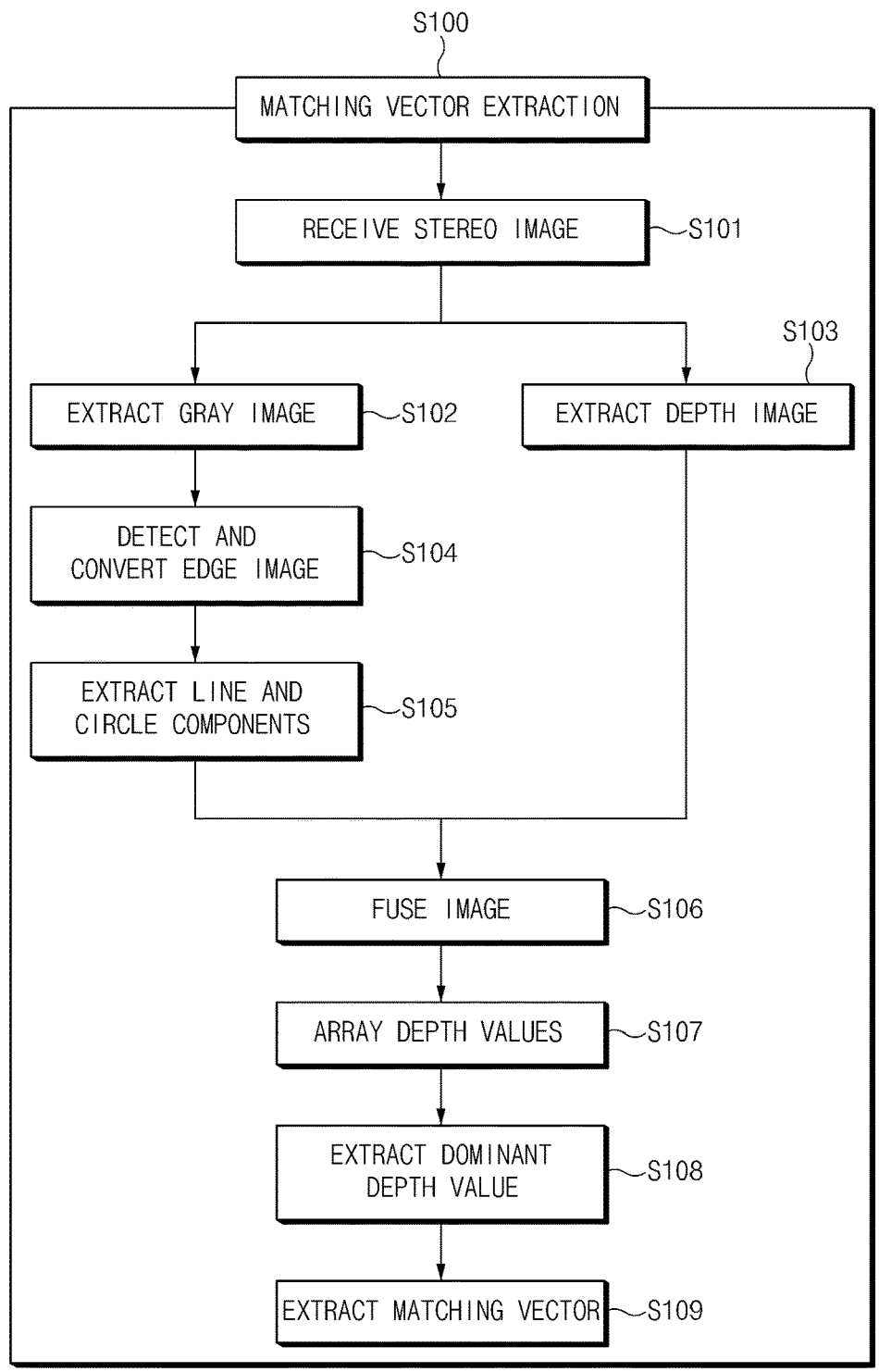
FIG. 14 is a flowchart illustrating a method for extracting a matching vector according to an embodiment of the present disclosure.

FIG. 14 is a flowchart illustrating a method for extracting a matching vector according to an embodiment of the present disclosure. In operation S101, a matching vector extracting unit 400 of FIG. 1 may receive a stereo image. In operation S102, the matching vector extracting unit 400 may extract a gray image from the stereo image. In operation S103, the matching vector extracting unit 400 may extract a depth image from the stereo image.

In operation S104, the matching vector extracting unit 400 may detect an edge from the gray image and may convert the gray image into an edge image. In operation S105, the matching vector extracting unit 400 may extract a line component and a circle image from the edge image.

In operation S106, the matching vector extracting unit 400 may fuse the gray image with the depth image using the line component of the gray image.

In operation S107, the matching vector extracting unit 400 may extract and array depth values from the fused image. In operation S108, the matching vector extracting unit 400 may extract at least one or more dominant depth values d1 and d2.

In operation S109, the matching vector extracting unit 400 may extract a matching vector for the at least one or more dominant depth values d1 and d2 from the stereo image. In this case, the matching vector extracting unit 400 may extract horizontal cumulative vectors h1 and h2 respectively accumulated for the at least one or more dominant values d1 and d2 from the stereo image and may extract vertical cumulative vectors v1 and v2 respectively accumulated for the at least one or more dominant depth values d1 and d2 from the stereo image.

Hereinafter, a description will be given of a map construction method S200 according to an embodiment of the present disclosure with reference to FIG. 15.

Figure 15:
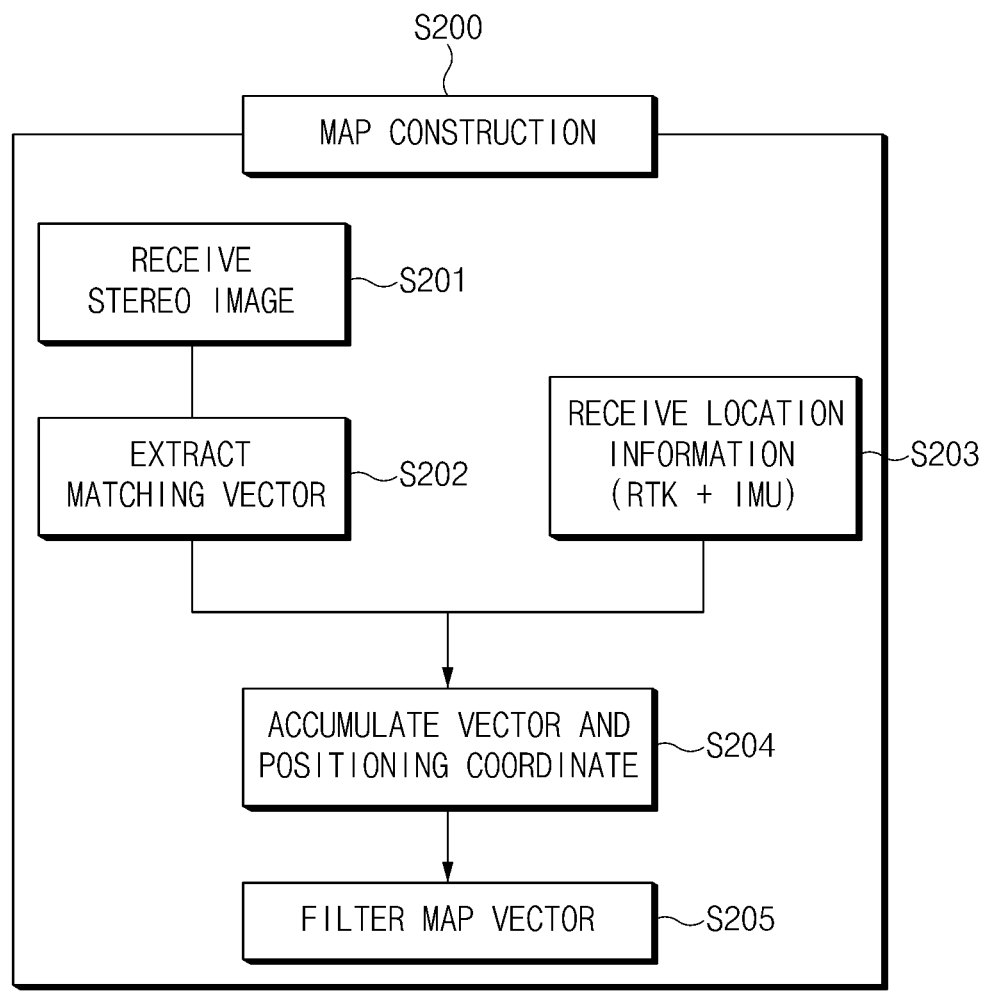
FIG. 15 is a flowchart illustrating a map construction method according to an embodiment of the present disclosure.

FIG. 15 is a flowchart illustrating a map construction method according to an embodiment of the present disclosure. In operation S201, a matching vector extracting unit 400 of FIG. 1 may obtain a stereo image while a vehicle is driven. In operation S202, the matching vector extracting unit 400 may extract a matching vector from the stereo image. In this case, the method for extracting the matching vector may be the same as that in FIG. 14.

In operation S203, a map constructing unit 500 of FIG. 1 may receive location information received from a position sensor.

In operation S204, the map constructing unit 500 may construct map data by accumulating and storing the matching vector and the location information together.

In operation S205, the map constructing unit 500 may construct the last map data by performing pseudovector filtering using an autocorrelation coefficient for the map data.

Hereinafter, a description will be given of a real-time localization method S300 according to an embodiment of the present disclosure.

Figure 16:
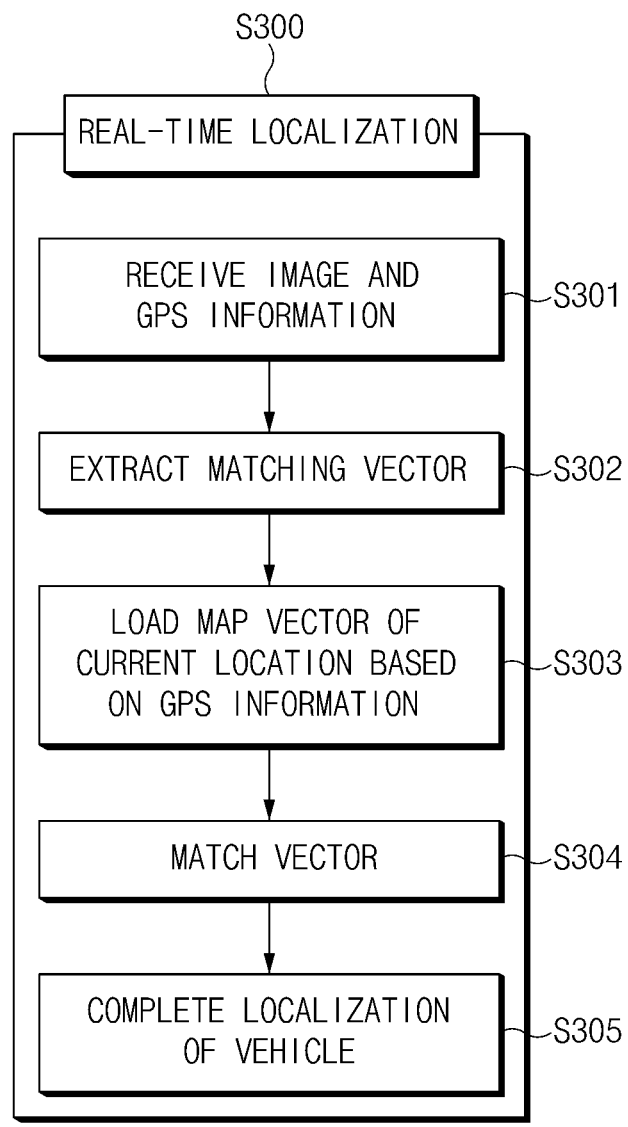
FIG. 16 is a flowchart illustrating a real-time localization method according to an embodiment of the present disclosure.

FIG. 16 is a flowchart illustrating a real-time localization method according to an embodiment of the present disclosure. In operation S301, a real-time localization unit 600 may obtain stereo image and GPS information while a vehicle is driven. In operation S302, the real-time localization unit 600 may interwork with a matching vector extracting unit 400 of FIG. 1 to extract a matching vector from the stereo image. In this case, the method for extracting the matching vector may be the same as that in FIG. 14.

In operation S303, the real-time localization unit 600 may load a map vector of a current location based on GPS information in map data previously constructed through a map constructing unit 500 of FIG. 1.

In operation S304, the real-time localization unit 600 may match the extracted matching vector with the map vector loaded from the map data.

If the extracted matching vector and the map vector meet a condition, in operation S305, the real-time localization unit 600 may estimate a positioning coordinate corresponding to the extracted vector as a current location of the vehicle. In other words, if a map vector corresponding to a vertical cumulative vector meets a reference value, the real-time localization unit 600 may estimate a positioning coordinate corresponding to a dominant depth value as a current location of the vehicle.

Herein, a description will be given of a detailed real-time localization method with reference to FIG. 17.

Figure 17:
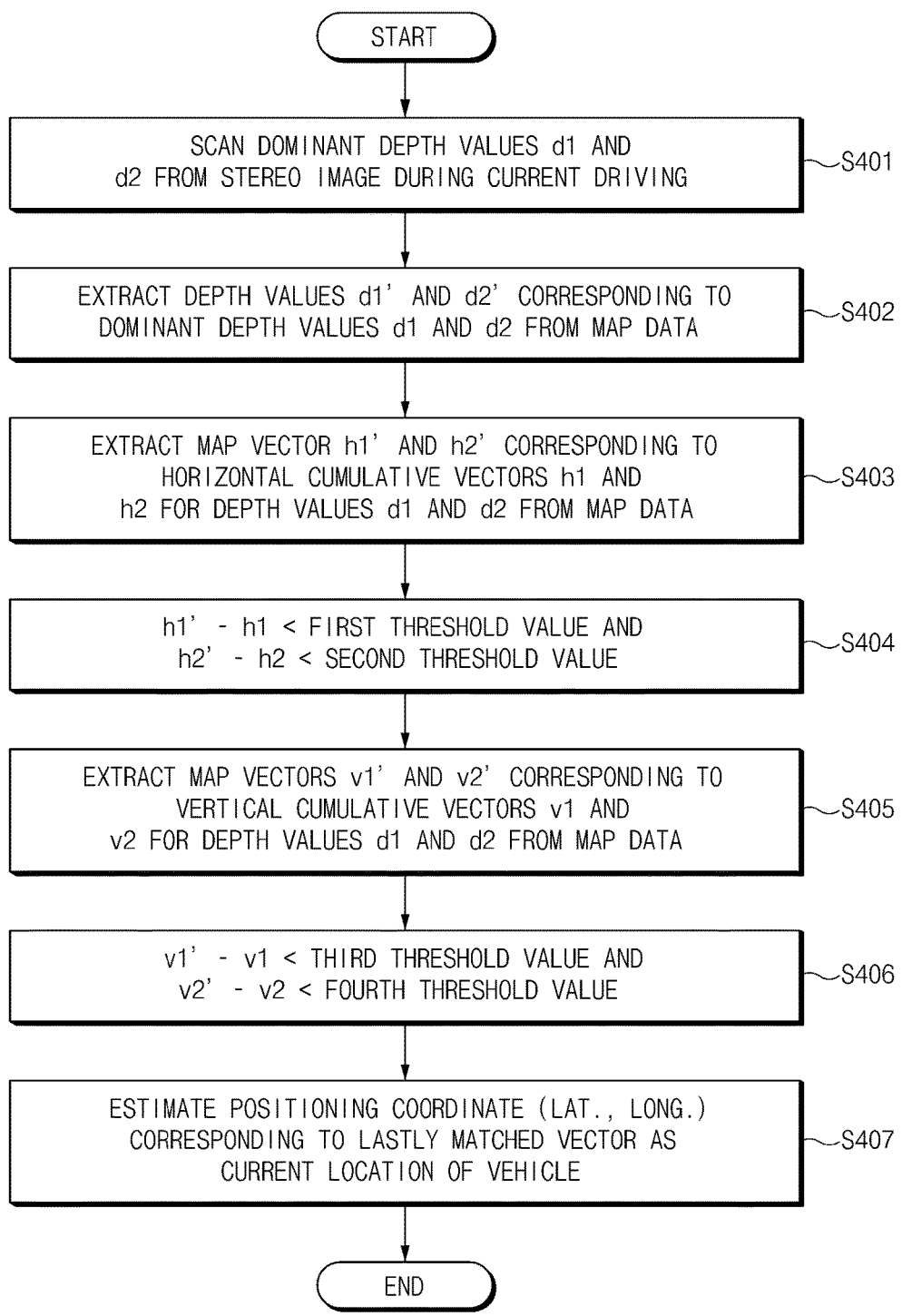
FIG. 17 is a flowchart illustrating a detailed real-time localization method according to an embodiment of the present disclosure.

FIG. 17 is a flowchart illustrating a detailed real-time localization method according to an embodiment of the present disclosure. In operation S401, a precise vehicle localization apparatus may scan dominant depth values d1 and d2 from a stereo image while a vehicle is driven.

In operation S402, the precise vehicle localization apparatus may extract depth values d1' and d2' respectively corresponding to the dominant depth values d1 and d2 from previously constructed map data.

In operation S403, the precise vehicle localization apparatus may extract map vectors h1' and h2' respectively corresponding to horizontal cumulative vectors h1 and h2 for the dominant depth values d1 and d2 from the map data.

If a value in which the horizontal cumulative vector h1 is subtracted from the map vector h1' is less than a first threshold value and if a value in which the horizontal cumulative vector v2 is subtracted from the map vector h2' is less than a second threshold value in operation S404, in operation S405, the precise vehicle localization apparatus may extract map vectors v1' and v2' respectively corresponding to vertical cumulative vectors v1 and v2 for the dominant depth values d1 and d2 from the map data.

If a value in which the vertical cumulative vector v1 is subtracted from the map vector v1' is less than a third threshold value and if a value in which the vertical cumulative vector v2 is subtracted from the map vector v2' is less than a fourth threshold value in operation S406, in operation S407, the precise vehicle localization apparatus may estimate a positioning coordinate corresponding to the lastly matched vector as a current location of the vehicle.

Figure 18A:
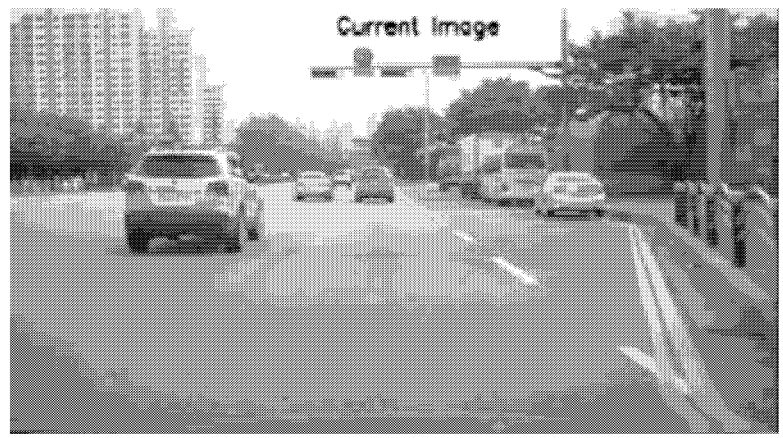
FIG. 18A is a drawing illustrating an example of a stereo image indicating a location of a vehicle in a real driving state.
Figure 18B:
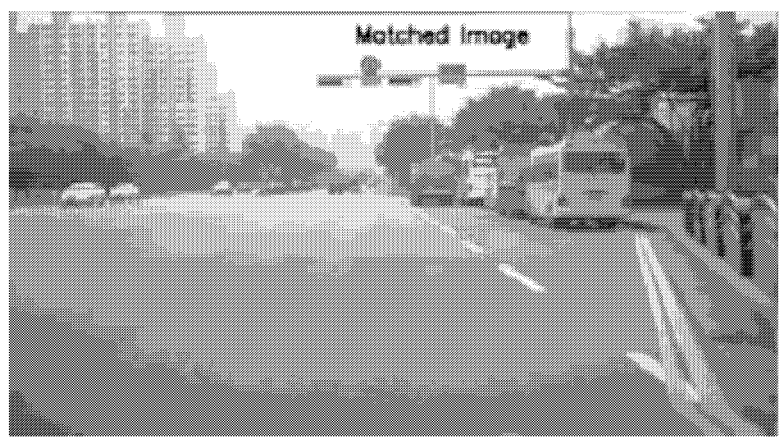
FIG. 18B is a drawing illustrating an example of an image matched with a vector of a current location in map data.

FIG. 18A is a drawing illustrating an example of a stereo image indicating a location of a vehicle in a real driving state. FIG. 18B is a drawing illustrating an example of an image matched with a vector of a current location in map data. In other words, it may be known that a location of a vehicle by a stereo image is the same as a current location of the vehicle based on map data.

Figure 19:
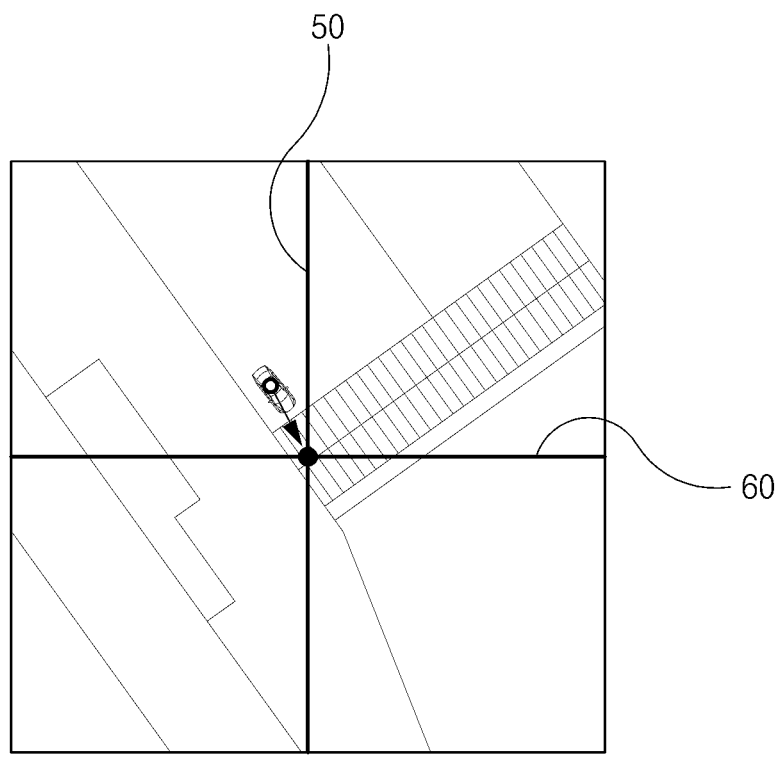
FIG. 19 is a drawing illustrating a current location based on a GPS and a location of a vehicle by a matching vector according to an embodiment of the present disclosure.

FIG. 19 is a drawing illustrating a current location of a vehicle by a current location based on a GPS and a location of the vehicle by a matching vector according to an embodiment of the present disclosure. In other words, it may be known that a little error occurs in a current location 50 based on a GPS and a real vehicle location 60 according to an embodiment of the present disclosure. In other words, it may be known that a current vehicle location 50 is different from a real vehicle location 60 based on a GPS.

As such, according to an embodiment of the prevent disclosure, it is possible to measure a location of the vehicle on multiple lanes without lane information. It is possible to accurately measure a location of the vehicle without interference in a forward obstacle (e.g., a car or a pedestrian). It is possible for longitudinal/lateral localization of a vehicle in a GPS shadow area. Also, it is possible for accurate vehicle localization upon a change of a season through depth extraction (e.g., a line and a circle) of a fixed object according to an embodiment of the present disclosure.

Figure 20:
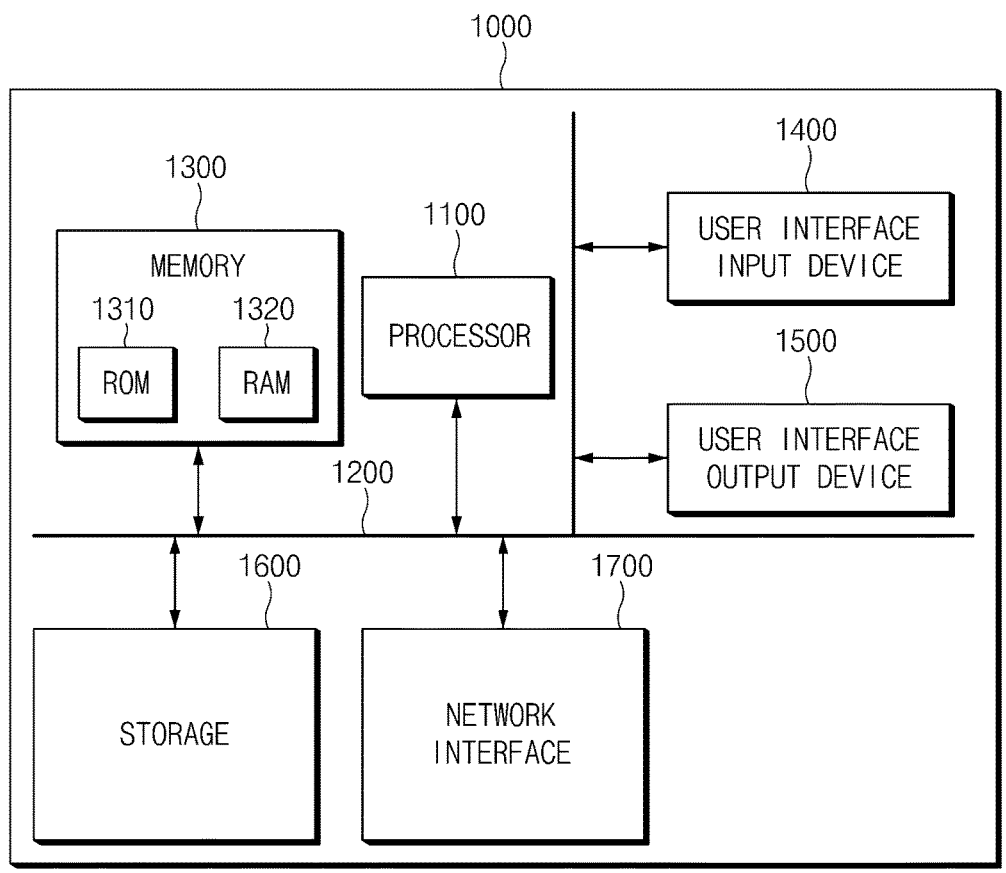
FIG. 20 is a block diagram illustrating a configuration of a computing system to which a precise vehicle localization method is applied, according to an embodiment of the present disclosure.

FIG. 20 is a block diagram illustrating a configuration of a computing system to which a precise vehicle localization method is applied, according to an embodiment of the present disclosure.

Referring to FIG. 20, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

An exemplary storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

According to various embodiments, the precise vehicle localization apparatus may increase the reliability of a vehicle system using vehicle location information by accurately estimating a location of the vehicle in multiple lanes without lane information or in a showdown area without irrespective of whether there is an obstacle.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. A vehicle localization apparatus comprising:
   an image input unit configured to obtain a stereo image while a vehicle is driven;
   a matching vector extracting unit configured to extract a matching vector from the stereo image while the vehicle is driven; and
   a real-time localization unit configured to load a map vector of a current location based on global positioning system (GPS) information in previously constructed map data and estimate a current location of the vehicle using the extracted matching vector and the loaded map vector,
   wherein the matching vector extracting unit comprises:
      a region of interest (ROI) setting unit configured to divide the stereo image into a gray image and a depth image and set an ROI;
      an edge image converting unit configured to convert the gray image into an edge image;
      a line component detecting unit configured to extract a line component from the edge image; and
      an image fusing unit configured to fuse the gray image, from which the line component is extracted, with the depth image.

2. The apparatus of claim 1, wherein the matching vector extracting unit further comprises:
   a dominant depth extracting unit configured to extract one or more dominant depth values from the fused image; and
   a matching vector extractor configured to extract the matching vector for the one or more dominant depth values from the stereo image.

3. The apparatus of claim 2, wherein the matching vector extracting unit is configured to:
   extract a horizontal cumulative vector which is a matching vector for each of the one or more dominant depth values from the stereo image; and
   extract a vertical cumulative vector which is a matching vector for each of the one or more dominant depth values from the stereo image.

4. The apparatus of claim 1, wherein the real-time localization unit comprises:
   a map vector loading unit configured to load the map vector of the current location based on GPS information in the map data;
   a vector matching unit configured to match the extracted matching vector with the map vector; and
   a vehicle localization unit configured to estimate a positioning coordinate corresponding to the extracted matching vector as a current location of the vehicle when the extracted matching vector and the map vector meet a condition.

5. The apparatus of claim 4, wherein the vector matching unit is configured to:
   extract a depth value, corresponding to a dominant depth value extracted from the stereo image while the vehicle is driven, from the map data;
   extract a map vector, corresponding to a horizontal cumulative vector obtained from the stereo image while the vehicle is driven, from the map data; and
   extract a map vector, corresponding to a vertical cumulative vector obtained from the stereo image while the vehicle is driven, from the map data, when a map vector corresponding to the horizontal cumulative vector meets a reference value.

6. A vehicle localization method comprising:
   obtaining a stereo image while a vehicle is driven;
   extracting a matching vector from the stereo image while the vehicle is driven;
   loading a map vector of a current location based on GPS information in previously constructed map data;
   matching the extracted matching vector with the map vector; and
   estimating a positioning coordinate corresponding to the extracted matching vector as a current location of the vehicle when the extracted matching vector and the map vector meet a condition,
   wherein extracting the matching vector comprises:
      dividing the stereo image into a gray image and a depth image;
      converting the gray image into an edge image;
      extracting a line component from the edge image; and
      fusing the gray image, from which the line component is extracted, with the depth image.

7. The method of claim 6, wherein extracting the matching vector further comprises:
   extracting one or more dominant depth values from the fused image; and
   extracting the matching vector for the one or more depth values from the stereo image.

8. The method of claim 7, wherein extracting the matching vector for the one or more dominant depth values comprises:

extracting a horizontal cumulative vector that is a matching vector for each of the one or more dominant depth values from the stereo image; and extracting a vertical cumulative vector that is a matching vector for each of the one or more dominant depth values from the stereo image.

9. The method of claim 8, wherein matching the extracting matching vector with the map data comprises:

extracting a depth value, corresponding to a dominant depth value extracted from the stereo image while the vehicle is driven, from the map data;

extracting a map vector, corresponding to the horizontal cumulative vector obtained from the stereo image while the vehicle is driven, from the map data; and extracting a map vector, corresponding to the vertical cumulative vector obtained from the stereo image while the vehicle is driven, from the map data, when a map vector corresponding to the horizontal cumulative vector meets a reference value.

10. The method of claim 9, wherein estimating the current location of the vehicle comprises estimating a positioning coordinate corresponding to the dominant depth value as the current location of the vehicle, when a map vector corresponding to the vertical cumulative vector meets a reference value.

* * * * *